United States Patent [19]

Dremann

[11] 4,185,806

[45] Jan. 29, 1980

[54] FLUID MATERIAL FLOW CONTROL VALVE

[76] Inventor: George H. Dremann, 1940 Hopkins St., Berkeley, Calif. 94707

[21] Appl. No.: 821,796

[22] Filed: Aug. 4, 1977

Related U.S. Application Data

[63] Continuation-in-part of Ser. No. 719,398, Sep. 1, 1976, abandoned.

[51] Int. Cl.² .............................................. F16K 7/10
[52] U.S. Cl. ................................... 251/61.1; 138/93; 166/321
[58] Field of Search ................ 251/61.1, 191, 1 R, 251/1 B, 5; 138/93; 277/34.3, 34.6; 166/319, 321

[56] References Cited

U.S. PATENT DOCUMENTS

| 2,720,378 | 10/1955 | Ottoi | 251/61.1 |
| 3,022,977 | 2/1962 | Jones | 251/61.1 |
| 3,432,139 | 3/1969 | Jentoft | 251/61.1 |

FOREIGN PATENT DOCUMENTS

| 1907865 | 10/1969 | Fed. Rep. of Germany | 251/61.1 |
| 2342202 | 3/1974 | Fed. Rep. of Germany | 25/61.1 |
| 714738 | 9/1954 | United Kingdom | 251/61.1 |

*Primary Examiner*—Arnold Rosenthal
*Attorney, Agent, or Firm*—Bruce & McCoy

[57] ABSTRACT

A fluid material flow control valve comprised of a conduit having an inlet end and an outlet end, and a remotely inflatable valving element disposed in the conduit between its inlet and outlet end such that the conduit can be variably opened to fluid flow by variably inflating the valving element and such that the conduit will always be closed to fluid flow when the valving element is deflated such as by intentionally withdrawing the inflating pressure source or through an accidental loss in system pressure.

27 Claims, 6 Drawing Figures

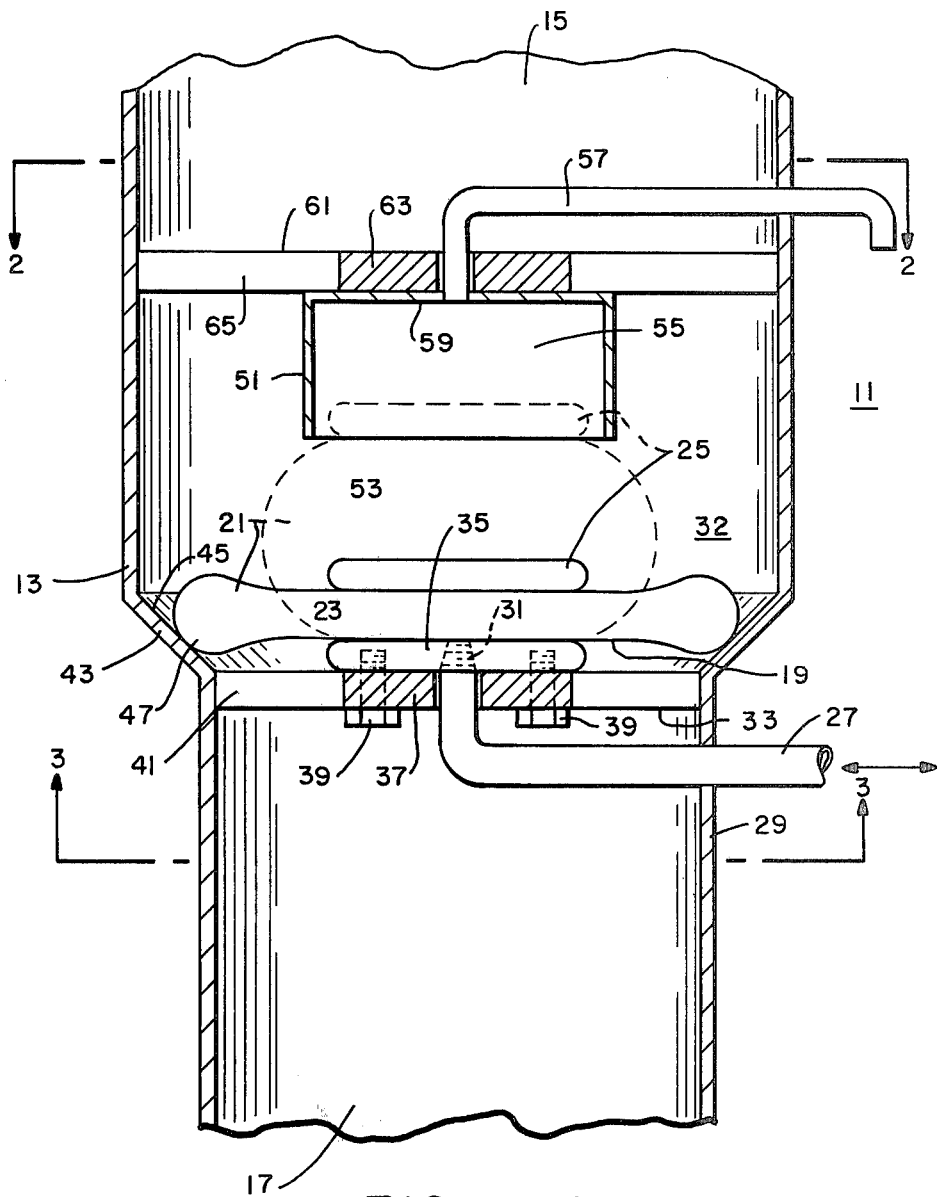
FIG.—1
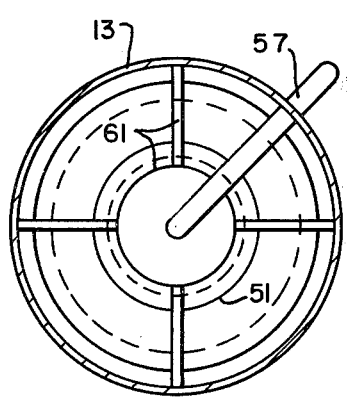
FIG.—2
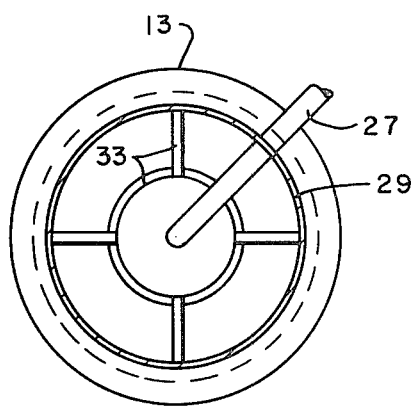
FIG.—3

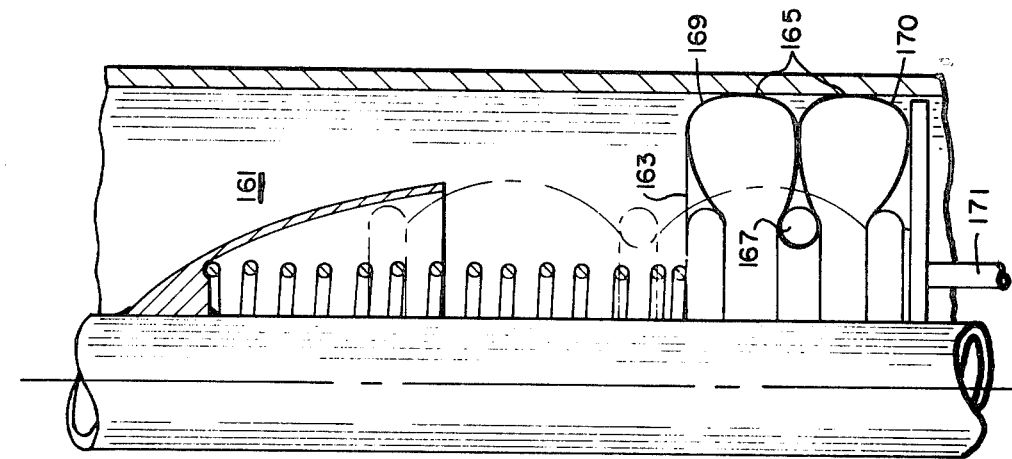
FIG.—6
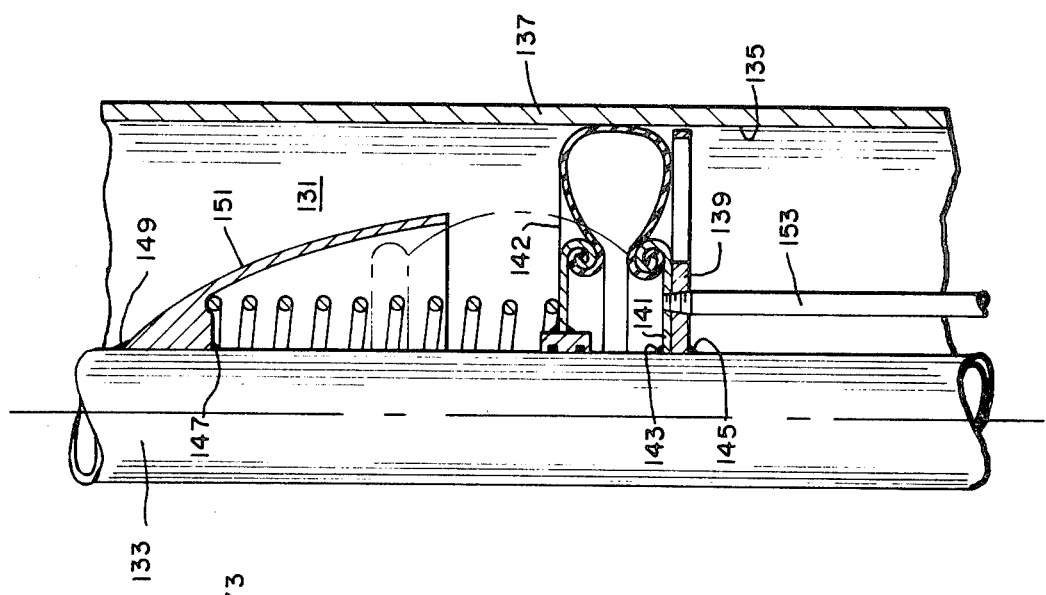
FIG.—5
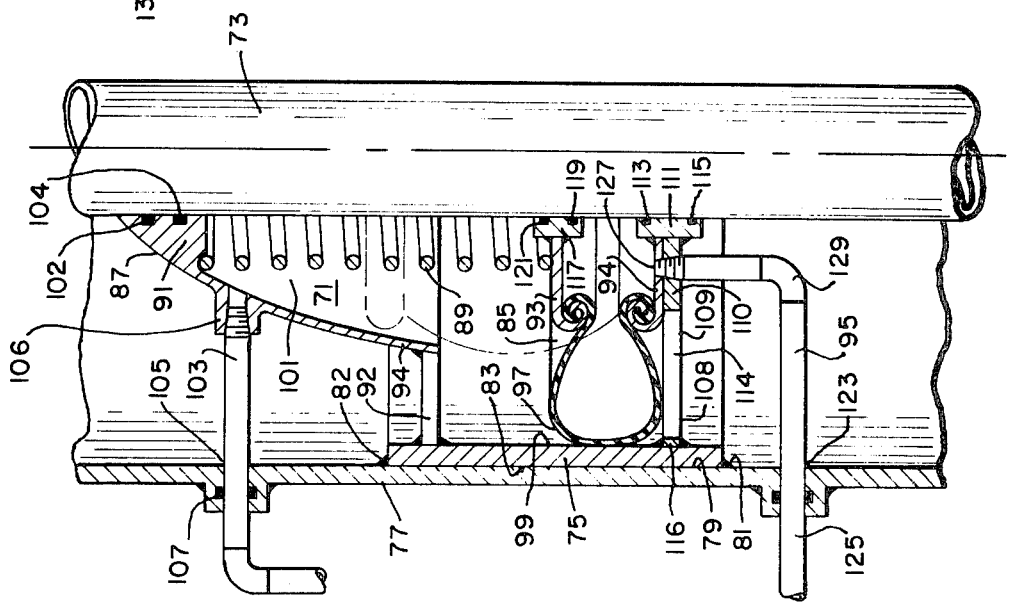
FIG.—4

FLUID MATERIAL FLOW CONTROL VALVE

This application is a continuation in part of Ser. No. 719,398, filed Sept. 1, 1976, and now abandoned.

BACKGROUND OF THE INVENTION

1. Field of the Invention

The present invention relates to valves in general, and more particularly to a fluid material flow control valve adapted to be remotely actuated by pneumatic or fluid means. The present invention is particularly adapted for use in connection with abrasive blasting systems where it is necessary to control the flow of abrasive media from one part of the system to another, for example, from a hopper to the system's abrasive media holding tank, or to control and modulate the flow of abrasive from the abrasive media holding tank to the abrasive blast hose. However, the other possible uses of the valve are manifold. In its various embodiments as described below the present invention is capable of handling and controlling the flow of almost any material capable of being moved through a conduit including gases, liquids, and particulate materials ranging in size from large diameter aggregate down to extremely fine powders.

2. Description of the Prior Art

Valves which control fluid material flow are well known. For example, it is known to control the gravity flow of abrasive media, such as sand, through a pipe by means of a pinch valve which can either be mechanically or pneumatically actuated. Such a pinch valve operates by simply pinching closed a flexible section of tubing through which the abrasive media flows. The pneumatic version of the pinch valve, which has the advantage of being remotely controllable, essentially consists of a length of flexible tubing surrounded by an air tight housing with means for pressuring the housing to pneumatically pinch closed the section of the tubing disposing therein.

The great disadvantage with the pneumatic pinch valve, as well as other commercially available valves, is that it is a normally open valve. Should for any reason there be a loss of pressure to the valve, such as, for example, due to a leak in an air supply line, then the valve would automatically open allowing an undesired flow of fluid material therethrough. The consequences of such an undesired flow can in many circumstances be costly. It can also create a hazardous condition such as an uncontrolled blast of abrasive, or an environmentally undesirable condition such as the accidental loss of crude oil from a pipe line or loading line hose.

The present invention overcomes the disadvantage of the conventional pneumatic pinch valve by providing a fluid material flow control valve which, though also pneumatically actuated, is normally closed and fail safe. In the present invention loss of pneumatic integrity will cause the valve to close, or remain closed, thereby preventing fluid material from flowing through the valve until suitable repairs can be made. The present invention also combines the advantage of a variable control capability wherein the invention can be adapted not only to an "on-off" function but also to a flow rate control function. The present invention has the further advantage of being adaptable to many different uses involving the control of fluid material flow, this because of the valve's unique capability of handling fluid materials of all forms (gas, liquid, particulate) and in extreme environments.

SUMMARY OF THE INVENTION

The present invention is a fluid material flow control valve comprised of a conduit means having an inlet end and an outlet end, and an inflatable valving means disposed in the conduit means between said inlet and outlet ends. Means are provided for supporting the valving means substantially on the axis of the conduit means. The valving means is of a shape and size whereby when deflated it transversely extends to close the conduit means thereby preventing fluid passage therethrough. Conversely, when inflated the valving means contracts in its transverse dimension to permit fluid flow therearound, consequently permitting fluid flow through the conduit means.

In its alternative embodiment, the present invention provides a fluid material valving assembly adapted to be inserted in a flow line. The valving assembly is comprised of an inflatable valving means mounted to a support means, with the entire assembly being adapted for insertion and securement within the flow line. The valving means is sized and shaped so that when properly secured within the flow line, it will transversly extend when deflated to close the flow line to fluid material flow, and when inflated will transversely contract to permit fluid flow therearound.

OBJECTS OF THE INVENTION

It is therefore an object of the present invention to provide a fluid material flow control valve which can be pneumatically or fluidly and remotely actuated.

It is another object of the present invention to provide a fluid material flow control valve wherein valve control is achieved by controlling the pneumatic or fluid pressure to an inflatable valving element.

It is a further object of the present invention to provide a fluid material control valve wherein the valve can be adapted to infinitely modulate the flow of material therethrough.

It is still another object of the present invention to provide a fluid material flow control valve which has a normally closed, fail safe condition.

It is still a further object of the present invention to provide a fluid material flow control valve which can be manufactured at low cost using commercially available parts.

It is yet another object of the present invention to provide a fluid material flow control valve which is adaptable to a wide variety of uses and which can operate under extreme environmental conditions.

It is yet a further object of the present invention to provide a valving assembly satisfying the above objects, which assembly can be inserted into an existing fluid material flow line for controlling fluid material flow therethrough.

Yet other objects of the present invention will become apparent from following specifications and claims.

DESCRIPTION OF THE DRAWINGS

FIG. 1 is a cross-sectional view, partially in schematic, of a fluid material flow control valve according to the present invention showing the inflatable valving means in a fully deflated and (in phantom lines) fully inflated position.

FIG. 2 is a top plan view of the fluid material flow control valve of FIG. 1 taken along lines 2—2.

FIG. 3 is a bottom plan view of the fluid material flow control valve of FIG. 1 taken along lines 3—3.

FIG. 4 is a partial cross-sectional view of an alternative embodiment of the present invention showing a valving assembly inserted into a section of a flow line.

FIG. 5 is a partial cross-sectional view of another alternative embodiment of the present invention showing another embodiment of the valving assembly shown in FIG. 4.

FIG. 6 is a partial cross-sectional view, partially in schematic, showing a two convolution inflatable valving means employed in connection with the valving assembly shown in FIG. 5.

DETAILED DESCRIPTION OF THE PREFERRED EMBODIMENT

The present invention is a valve for controlling the flow of fluid materials. "Fluid materials" as used herein is taken to mean any material, whether a gas, liquid, or particulate, which is reasonably capable of being conveyed through a conduit.

Referring now to the drawings, and particularly to the embodiment shown in FIGS. 1-3, the fluid material flow control valve, generally designated by the number 11, is comprised of conduit means 13 having an inlet end 15 and an outlet end 17. The conduit means is preferably cylindrical in shape and is suitably adapted for connection to a fluid material flow line. Conveyance of the fluid material through the conduit 13 can be effected by gravity, by pressure, or by vacuum, and the flow may even consist of lighter than air gases permitted to rise up through the valve. In the case of gravity flow, the flow control valve 11 is operated in a vertical position, with the fluid material entering the valve by gravity through the top inlet end 15, and, when the valving mechanism is in an open condition, exiting by gravity through the outlet end 17.

As best seen in FIG. 1, an inflatable valving means 19 is disposed in the conduit means 13 for opening and closing the fluid passageway therethrough. The valving means 19 is inflatable in the sense that it changes shapes in the presence or absence of some remotely applied internal pressure; as shown it assumes a shape somewhat like a bulging barrel when inflated and an under-inflated inner tube when deflated. In its construction, valving means 19 is comprised of a durable, but flexible elastomeric material 21 supported between a rigid base portion 23 and a top reinforceing plate 25. It is contemplated that a commercially available air spring could be used as the inflatable valving means with only slight modifications. The inflatable valving means 19 is remotely inflated and deflated through air supply line 27 which, as shown, extends from outside the control valve 11 through the wall 29 of the conduit means. This air supply line pneumatically connects to the inflatable valving means through a threaded connection 31 in the rigid base portion 23, and is fed by a suitable pressurized air supply (not shown) through any suitable valve or valve arrangement which would allow an operator to selectively pressurize or exhaust the line. It is seen specifically that in its deflated condition the inflatable valving means 19 presents a relatively large transverse dimension, which in its preferred cylindrical construction would mean a relatively large diameter when seen in plan view, when compared to its diameter in its inflated condition. The diameter or size of the valving means is chosen such that when deflated it will radially extend a sufficient distance to engage or mate with the inside wall surface 45 of the conduit means while, when inflated, providing a sufficient annular opening 32 between the conduit wall and valving means to allow substantial flow of fluid material therethrough. It is important to note that because of this construction the control valve 11 is normally closed, that is, it is closed to fluid material flow when the inflatable valving means 19 is in its deflated condition. It is also understood that the degree of inflation can be controlled by controlling the pressure to the valving means such as by a pressure regulator or a pressure modulating on/off valve. Such control would provide the capability for modulating the flow of fluid material through the valve by controlling the size of annular opening 32.

Preferably, there are two means of support for the inflatable valving means in order to hold the valving means in its operative position within the conduit means. A first support means 33 supports the center portion 35 of the valving means and preferably consists of a spider-shaped element having a solid center 37 secured to the rigid base portion 35 of the valving means, such as by bolts 39, and a plurality of legs 41 extending radially outwardly from the solid center 37 to engage the wall 29 of the conduit means. Although the first support element is shown as having four radially extending legs, it is understood that any number of legs can be provided which would adequately support the valving means. The first support means, instead of having a spider shape, might alternatively consist of a plate having suitably sized and positioned openings formed therein for permitting fluid flow therethrough. Whatever design is chosen, there must be a sufficiently large passage through the support means to the side of valving means 19 to permit flow through the conduit when the control valve is in an open condition.

A second support means is also preferably provided for supporting the extreme perimeter of the inflatable valving means when the valving means is in its deflated condition. Supporting the extreme perimeter of the deflated valving means is desirable since the system pressure or the weight of particulate fluid material which would accumulate on top of the valving means when the valving means is closed might in certain uses of the control valve tend to collapse the valving means at its extreme outer perimeter or rim 47, thereby causing leakage through the control valve. As seen in FIG. 1, the support means for the extreme perimeter of the valving means can consist simply of a restriction 43 formed in the wall of the conduit means substantially adjacent to where the valving means 19 is supported. Such a restriction provides a shoulder surface 45 which, as shown, is conically shaped and which engages and supports the extended perimeter 47 of the deflated valving means thereby keeping it from collapsing under system pressure or the weight of the fluid material. Alternative support means are seen in, and later described in connection with, the embodiments disclosed in FIGS. 4-6. While a support means for the valving means perimeter 47 would be called for in many applications, it should be noted that an affirmative supporting structure for the valving means perimeter is not essential to the concept of the invention. In certain applications it would indeed be possible to simply select a straight walled conduit having an inside diameter or dimension smaller than the diameter or dimension of the perimeter of the valving means whereby when deflated the valving means would extend to engage and wedge against the straight inside walls of the conduit. The wedging or seating of the valving means against a straight wall would in fact be enhanced by a not excessive system pressure or the weight of lighter fluid materials.

As shown in FIG. 1, the inflatable valving means 19, when inflated, extends upwardly toward the inlet end 15 of the control valve, and, when particulate material flow is involved, must displace particulate material accumulated above or on the pressure side of the previously closed valve. To facilitate the opening of the valve against the accumulated particulate material, an inverted receptacle member 51 having a bottom open end 53 can be supported in conduit means 13 in spaced relation above the inflatable valving means 19. As shown, the inverted receptacle has a relatively small transverse dimension in relation to the passage through the conduit means in order to permit substantial flow of the fluid material therearound. The receptacle acts to provide a free air space 55 above the valving means into which particulate fluid material can be moved when the valving means is inflated to the position shown in FIG. 1 by phantom lines. It is noted that in this position the top portion of the valving means may actually move into the receptacle. To allow air to freely move in and out of the receptacle as the valving means is, respectively, deflated and inflated, a breather tube 57 communicates from the upper wall 59 of the receptacle through the wall of the conduit means.

Generally, the inverted receptacle member 51 would only be required when the valve is to handle the flow or dense or heavy bulk materials as opposed to fine powders, liquids or gases.

As shown, the inverted receptacle member is supported within the conduit means by a spider shaped element 61 similar to the first support means 33 employed to support the center of the inflatable valving means. Specifically, the inverted receptacle 51 is attached, by any suitable attachment means, to the solid center 63 of spider element 61, with the arms 65 thereof extending radially outwardly to engage the inside walls of the conduit means where they are secured to support the assembly in a fixed position. Although other support means could be used, the spider element design would allow for a maximum flow of fluid material through the flow line.

FIG. 4 discloses an alternative embodiment of the present invention wherein the control valve consists of a separate valving assembly, generally denoted as 71, built around and journelled with respect to a central shaft 73. The valving assembly is secured as a unit within an outer sleeve 75, which sleeve is of a diameter to slide with a section of conduit 77 which is part of a fluid material flow line. Upon suitably positioning the valving assembly within conduit 77, the assembly is secured in the fluid line by securing sleeve 75 to the inner conduit wall 79. Suitable means of securement would include sleeve welds 81, 82; alternative securement means which are not shown would include, but would not be limited to, mating sealing threads formed on the inner conduit wall 79 and the outer sleeve wall 83.

A valving assembly similar to that shown in FIG. 4 might be used in a variety of applications, such as drilling operations, where it is advantageous to have a shaft, such a central shaft 73, deployed within the flow line. The central shaft 73 can be fabricated from either hollow or solid stock and if hollow may be capped at one or both ends as the particular application requires. It is understood that, though FIG. 4 shows one central shaft, the valving assembly can be designated to accomodate a multiple of shafts.

The valving assembly 71 which is built around the central shaft 73 is seen to comprise inflatable valving means 85 of a construction similar to the valving means 19 shown in the FIG. 1 embodiment. It also comprises an inverted receptacal member 87 disposed above the valving means 85, and a bias spring 89 in compression between the upper base portion 91 of receptacal member 87 and the valving means' top reinforcing plate 93. When the inflatable valving means 85 is inflated through pressure supply line 95, the valving means will assume the axially extended position shown in phantom lines (the bulging barrel shape previously described) thereby compressing bias spring 89. When the valving means is subsequently deflated the bias spring will act to quickly force the valving means back to its radially extended shape whereby the outer perimeter 97 of the valving means seals against the inner sleeve wall 99 to effect closure of the conduit 77 to any fluid material passing therethrough.

Again, it is contemplated that the inverted receptacle member 87 would only be used for valve applications involving a dense particulate fluid material whereby the particulate which accumulates on top of the valving means 85 can be pushed, upon inflating the valving means, into the dead air space 101 formed by the inverted receptacle member; the breather tube 103, which extends through conduit wall opening 105 and thereat sealed by O-ring 107, is provided to vent the air which is displaced as the valving means axially extends.

The valving assembly is further comprised of means for supporting the valving means 85. As shown in FIG. 4, this support means consists of support plate 109 through which the central shaft 73 is journalled with the shaft being sealedly captured by shaft ring 111 and O-rings 113 and 115; at its perimeter the support plate 109 is secured, such as by welds, to sleeve 75. It is seen that the central portion 110 of the support plate is solid and is secured to the bottom reinforcing plate 94 of the valving means 85. It is further seen that the top reinforcing plate 93 of the valving means provides additional journelled and sealed securement to the central shaft, in this case by means of support ring 117 and O-rings 119 and 121. As the valving means axially extends due to an inflationary pressure from pressure supply line 95, support ring 117 will slide on the central shaft 73.

The support plate 109 at its outer perimeter portion 108 also serves as a support means for the outer perimeter 97 of the valving means 85 when the valving means is in its shown deflated condition. To provide a substantial passage for the fluid material when the valve is open, the support plate can have a spider-shape, with radial arms 114 connecting central portion 110 to the plates circumferential rim 116. As an alternative to the spider-shaped support plate configuration, a solid plate with suitably sized and suitably positioned openings could be provided.

Securement of the inverted receptacle member 87 to outer sleeve 75 is provided by radial arms 92 suitably spaced about the lower rims 94 of the receptacle member. Alternative means of supporting the receptacle member to the sleeve are possible so long as adequate fluid material passage around the sides of the receptacle is provided. The central shaft is seen as being sealedly journalled through the top base portion 91 of the receptacle member by means of O-rings 102 and 104. Preferably, the receptacle member will have a curved, fluid dynamic shape to provide streamlined flow when the valve is open.

The pressure supply line 95 through which the valving means is inflated is shown as sealedly extending at its supply end 125 through conduit wall opening 123, and at its terminal end 127 through both the central portion 110 of support plate 109 and the bottom reinforcing plate 94 of the valving means.

To install the valving assembly 71 in a flow line, the assembly is slidably inserted into a flow line section along central shaft 73 to a predetermined position having suitable openings for supply line 95 and breather tube 103. Once properly rotated to align breather tube port 106 with conduit wall opening 105, the sleeve 75 is secured to the inner conduit wall 79 by, for example, welds 81 and 82. The breather tube 103 is then inserted through conduit wall opening 105 and threaded into port 106, and the pressure supply line 95 is assembled using, for example, an elbow 129.

FIG. 5 of the drawings discloses an alternative embodiment to the valving assembly shown in FIG. 4 wherein the valving assembly, generally denoted 131, is rigidly secured to central shaft 133 and wherein no attachment is provided with the inside wall 135 of the fluid line 137. Specifically, support plate 139 together with the attached bottom reinforcing plate 141 of valving means 142 is seen to be secured to the central shaft by means of circumferential welds 143, 145, with similar weld securements 147 and 149 being made with respect to receptacle member 151. In this embodiment the outer sleeve 75 of the valving assembly shown in FIG. 4 is eliminated.

The embodiment shown in FIG. 5 would be particularly useful in an application where the valving assembly 131 is to be positioned in a particularly inaccessible portion of the flow line or where its deployment in the line is intended to be very temporary. Insertion in the line can be made by means of the central shaft 133 with remote pressurization the valving means being supplied by means of extended pressure supply line 153. While the supply line 153 is shown as being fed in through the flow line 137, it would equally be possible for the supply line to feed in through the central shaft 133, provided a hollow shaft is employed. Again, it should be noted that in many applications the inverted receptacle member 151 will not be used.

FIG. 6 of the drawings illustrates a valving assembly 161 employing a double convoluted valving means 161 instead of a single convoluted valving means as shown in FIGS. 1, 4, and 5. The embodiment of FIG. 6 is otherwise identical to the one in FIG. 5. The double convoluted valving means, as shown, is essentially formed by a single annular piece of elastomeric material 165 pinched in the middle by a restraining ring 167. Since, with this construction, the air or fluid chambers formed by the separate convolution 169, 170 would be in pneumatic or fluid communication, pressurization of the valving means through pressure supply line 171 would cause the valving means to extend to the stacked barrel shape shown in phantom lines. Alternatively, the air or fluid chambers of each of the convolution 169, 170 might be pneumatically or fluidly isolated and separately pressurizable whereby greater control of the valving operation can be effected.

It is understood that a valving means having more than two convolutions could be provided with any combination of the chambers formed by the convolutions being in communication with or isolated from one another. The added in phase or out of phase control provided by two or more convolutions may be particularly advantageous in applications involving medium and large sized aggregate where, upon closing the valve, oversized particles may become wedged between the valving means perimeter and the inner wall of the flow line.

In operation, and with reference to FIGS. 1, 4, 5, and 6, the fluid material flow control valve and valving assembly of the present invention is opened, in the respective embodiments, by pressurizing the inflatable valving means through air supply lines 27, 95, 153, or 171. To close the valve, the valving means is simply exhausted through this same air supply line by a suitable external valving mechanism.

Thus, the present invention is a fluid material flow control valve which can be remotely actuated by pneumatic or other pressure means and which is fail safe by being closed in the absence of pressure. The present invention is also adaptable to an extremely wide variety of uses and applications, and further provides the capability of infinitely modulating the flow of fluid material through the valve should such a function be desired. Although the present invention has been described in considerable detail in the above specification, it is not intended that it be limited to such detail, except as may be necessitated by the following claims.

What I claim is:

1. A fluid material flow control valve comprising
   a conduit means having an inside wall surface, an inlet end and an out let end, and
   a remotely inflatable valving means disposed in said conduit means and supported substantially on the axis thereof between said inlet and outlet ends, said inflatable valving means being normally deflated to present a relatively large transverse dimension and having a size and shape whereby in its deflated condition the perimeter of said valving means transversely extends to engage the inside wall surface of said conduit means to prevent fluid passage between the inlet and outlet ends thereof, and said inflatable valving means substantially freely extending in an axial direction within said conduit means when inflated so as to present a relatively small transverse dimension in its inflated condition whereby in its inflated condition the valving means contracts at its perimeter to provide a passage between its perimeter and said conduit inside wall surface to permit fluid material flow through said conduit means.

2. The fluid material flow control valve of claim 1 including a first support means for supporting the center portions of said inflatable valving means substantially on the axis of said conduit means such that fluid material is allowed to flow around said valving means when said valving means is in its inflated condition.

3. The fluid material flow control valve of claim 1 wherein at least the perimeter of said valving means is fabricated of a flexible, elastomeric material whereby when deflated said valving means perimeter will extend to firmly seat with said conduit inside wall surface, even through said conduit inside wall surface may be relatively rough and uneven.

4. The fluid material flow control valve of claim 1 wherein the inside wall surface of said conduit means which is engaged by the perimeter of said valving means includes a shoulder surface formed by a restriction in said conduit means substantially adjacent said valving means.

5. The fluid material flow control valve of claim 1 wherein said conduit means has a cylindrical shape and said inflatable valving means has a substantially circular shape when seen in plan view, the diameter of said valving means being great enough to permit the valving means perimeter to extend to firmly seat against the inside wall surface of said conduit means when the valving means is in a deflated condition.

6. The fluid material flow control valve of claim 2 wherein said remotely inflatable valving means includes a rigid base portion secured to said first support means such that when inflated said valving means extends upwardly toward the inlet end of said conduit means.

7. The fluid material flow control valve of claim 6 further comprising an inverted receptacle member supported in said conduit means in spaced relation above said inflatable valving means, said inverted receptacle member having a relatively small transverse dimension in relation to the passage through said conduit means to permit fluid flow therearound, and providing a free air space above said inflatable valving means into which fluid material can be moved when said valving means is inflated.

8. The fluid material flow control valve of claim 7 wherein said inverted receptacle member includes breather tube pneumatically communicating to the outside of said conduit means whereby air is allowed to flow into and out of said inverted receptacle member as said valving means is deflated and inflated.

9. The fluid material flow control valve of claim 1 wherein said inflatable valving means is adapted to be variably inflated whereby the flow of said fluid material through said conduit means can be modulated.

10. A fluid material flow control valve comprising
a cylindrical conduit means having an inlet end and an outlet end and a restriction therebetween,
a remotely inflatable valving means disposed in said conduit means between the inlet and outlet ends thereof and substantially adjacent said conduit means restriction, said inflatable valving means having a substantially circular shape when seen in plan view, the diameter of which is relatively large when said valving means is in its deflated condition, and relatively small when in its inflated condition, and being of a size whereby in its deflated condition the perimeter of the valving means transversely extends to prevent fluid material passage between the inlet and outlet ends of said conduit means, and in its inflated condition transversely contracts to permit fluid flow through said conduit means, said valving means having a rigid base portion secured centrally thereto,
a first support means secured to said rigid base portion of said inflatable valving means for supporting the valving means substantially on the axis of said conduit means such that when inflated said valving means extends upwardly toward the inlet end of said conduit means,
a second support means for supporting the extended perimeter of said inflatable valving means when in its deflated condition, said second support means being comprised of the shoulder surface formed by the restriction in said conduit means, and
an inverted receptacle member supported in spaced relation above said valving means, said inverted receptacle member having a relatively small transverse dimension in relation to the passage through said conduit means to permit fluid flow therearound and providing a free air space above said inflatable valving element into which fluid material can be moved when said valving means is inflated, said inverted receptacle member including a breather tube pneumatically communicating to the outside of said conduit means whereby air can flow into and out of said inverted receptacle member as said valving means is deflated and inflated.

11. The fluid material flow control valve of claim 10 further including a bias spring disposed to compressively engage the top of said valving means whereby when deflated the valving means is quickly returned to its full transversely extended shape by the biasing force of said bias spring thereby effecting closure of said flow control valve in a relatively short period of time.

12. A fluid material flow control valve comprising
a cylindrical conduit means having an inlet end and an outlet end and a restriction therebetween,
a remotely inflatable valving means disposed in said conduit means between the inlet and outlet ends thereof and substantially adjacent said conduit means restriction, said inflatable valving means having a substantially circular shape when seen in plan view, the diameter of which is relatively large when said valving means is in its deflated condition, and relatively small when in its inflated condition, and being of a size whereby in its deflated condition the perimeter of the valving means transversely extends to prevent fluid material passage between the inlet and outlet ends of said conduit means, and in its inflated condition transversely contracts to permit fluid flow through said conduit means, said valving means having a rigid base portion secured centrally thereto,
a first support means secured to said rigid base portion of said inflatable valving means for supporting the valving means substantially on the axis of said conduit means such that when inflated said valving means extends upwardly toward the inlet end of said conduit means, and
a second support means for supporting the extended perimeter of said inflatable valving means when in its deflated condition, said second support means being comprised of the shoulder surface formed by the restriction in said conduit means.

13. The fluid material flow control valve of claim 12 further including a bias spring disposed to compressively engage the top of said valving means whereby when deflated the valving means is quickly returned to its full transversely extended shape by the return force of said bias spring thereby effecting closure of said flow control valve in a relatively short period of time.

14. A valving assembly adapted to be operatively inserted within a substantially straight and compatably sized section of a fluid material flow line for controlling the flow of fluid material therethrough, said valving assembly comprising
a remotely inflatable valving means having a size and shape whereby, when disposed substantially on axis within said fluid material flow line, said valving means will, when deflated, transversely extend at its perimeter such that its perimeter will engage an inside wall surface of said fluid material flow line so as to close said flow line to fluid material flow therethrough, and will, when inflated, axially extend itself so as to transversely contract at its perimeter to provide a passage between its perimeter and said conduit inside wall surface to permit fluid material flow through said flow line, and means for supporting said valving means wherein the valving assembly formed by said valving means and support means is adapted to be inserted in an operative position within said fluid material flow line.

15. The valving assembly of claim 14 wherein said valving assembly can be inserted within a flow line such that, when inflated, said valving means axially extends from said support means against the direction of flow of said fluid material and whereby, when deflated, the pressure in said flow line tends to force the perimeter of said valving means outwardly against said flow line's inside wall surface to provide substantially sealing engagement therebetween.

16. The valving assembly of claim 15 further comprising a bias spring disposed to compressively engage the extendable end of said valving means whereby when deflated the valving means will be quickly returned to its full transversely extended shape by the return force of said bias spring thereby effecting closure of said valve in a relatively short period of time.

17. The valving assembly of claim 15 including an outer sleeve of a size and shape to closely slide within said fluid material flow line, said support means securing said valving means to said outer sleeve in axial alignment therewith, and said support means having a substantial fluid material passage therethrough between the central portion of said support means and said outer sleeve, whereby the valving assembly as a unit can be slidably inserted within said flow line and secured therein by suitable securement of said sleeve to the flow line inside wall surface.

18. The valving assembly of claim 17 wherein said valving assembly is build around a central shaft adapted to be disposed substantially along the axis of said fluid material flow line, said shaft being sealedly journalled with respect to said valving assembly whereby the valving assembly can be inserted into said flow line on or along said central shaft and whereby said central shaft can be axially or rotatably moved with respect to said valving assembly.

19. The valving assembly of claim 15 further comprising an inverted receptacle member supported in spaced relation above said inflatable valving means in the direction of extension of said valving means, said inverted receptacle member having a relatively small transverse dimension in relation to the passage through said conduit means to permit fluid flow therearound, and providing a free air space above said inflatable valving means into which fluid material can be moved when said valving means is inflated.

20. The valving assembly of claim 19 wherein said inverted receptacle member includes a breather tube pneumatically communicating to the outside of said flow line whereby air can flow into or out of said receptacle member as said valving means is, respectively, deflated and inflated.

21. The valving assembly of claim 15 wherein said valving assembly is built around and secured to a central shaft adapted to be disposed substantially along the axis of said flow line whereby said valving assembly can be inserted within said flow line on said central shaft, said valving assembly being held on axis thereby by said central shaft so as to close said flow line to fluid flow thereby remote inflation of said valving means will open said flow line and whereby loss or withdrawal of inflating pressure will cause said flow line to close.

22. The valving assembly of claim 14 wherein said inflatable valving means is formed such that its perimeter has at least two convolutions whereby when said valving means is deflated both of said convolutions transversely extend to close said flow line to fluid material flow.

23. The valving assembly of claim 22 wherein each convolution of said perimeter is independently inflatable whereby the transverse extension of said convolutions can be separately controlled.

24. The fluid material flow control valve of claim 1 wherein said inflatable valving means assumes a substantially collapsed double dish shape when in its fully deflated condition and a substantially extended barrel shape when in its fully inflated condition.

25. The fluid material flow control valve of claim 10 wherein said inflatable valving means assumes a substantially collapsed double dish shape when in its fully deflated condition and a substantially extended barrel shape when in its fully inflated condition.

26. The fluid material flow control valve of claim 12 wherein said inflatable valving means assumes a substantially collapsed double dish shape when in its fully deflated condition and a substantially extended barrel shape when in its fully inflated condition.

27. The fluid material flow control valve of claim 14 wherein said inflatable valving means assumes a substantially collapsed double dish shape when in its fully deflated condition and a substantially extended barrel shape when in its fully inflated condition.

* * * * *

UNITED STATES PATENT OFFICE
CERTIFICATE OF CORRECTION

Patent No. 4185806       Dated January 29, 1980

Inventor(s) George H. Dremann

It is certified that error appears in the above-identified patent and that said Letters Patent are hereby corrected as shown below:

Column 3, line 50, "reinforceing" should read --reinforcing--.

Column 3, line 53, after the word "modifications.", begin a new paragraph.

Column 6, line 4, "designated" should read --designed--.

Column 6, line 10, "receptacal" should read --receptacle--.

Column 6, line 12, "receptacal" should read --receptacle--.

Column 6, line 46, "Journelled" should read --Journalled--.

Column 8, line 36, "out let" should read --outlet--.

Column 8, line 67, "through" should read --though--.

UNITED STATES PATENT OFFICE
CERTIFICATE OF CORRECTION

Patent No. 4185806  Dated January 29, 1980

Inventor(s) George H. Dremann

It is certified that error appears in the above-identified patent and that said Letters Patent are hereby corrected as shown below:

Column 9, line 33, insert --a-- before "breather tube".

Column 11, line 50, delete "15" and insert therefor --17--.

Column 11, line 42, "build" should read --built--.

Column 12, line 20, "thereby" should read --whereby--.

Signed and Sealed this

Eleventh Day of November 1980

[SEAL]

Attest:

SIDNEY A. DIAMOND

Attesting Officer  Commissioner of Patents and Trademarks